(12) United States Patent
Aalto (10) Patent No.: US 12,198,506 B2
(45) Date of Patent: Jan. 14, 2025

(54) ELECTRONIC DEPLETING POOL LOTTERY (71) Applicant: Veikkaus Oy, Helsinki (FI)

(72) Inventor: Markku Aalto, Helsinki (FI)

(73) Assignee: VEIKKAUS OY, Helsinki (FI)

( * ) Notice: Subject to any disclaimer, the term of this patent is extended or adjusted under 35 U.S.C. 154(b) by 758 days.

(21) Appl. No.: 17/225,741

(22) Filed: Apr. 8, 2021

(65) Prior Publication Data

US 2021/0319647 A1 Oct. 14, 2021

(30) Foreign Application Priority Data

Apr. 9, 2020 (FI) .................................. 20205378

(51) Int. Cl.
G07F 17/00 (2006.01)
G06F 7/58 (2006.01)
G07F 17/32 (2006.01)

(52) U.S. Cl.
CPC ............ *G07F 17/329* (2013.01); *G06F 7/582* (2013.01); *G07F 17/3244* (2013.01)

(58) Field of Classification Search
None
See application file for complete search history.

(56) References Cited

U.S. PATENT DOCUMENTS

| 2002/0090986 | A1* | 7/2002 | Cote | G07F 17/3248 463/16 |
| 2005/0096116 | A1 | 5/2005 | Mindes | |
| 2006/0258433 | A1* | 11/2006 | Finocchio | A63F 3/062 463/43 |
| 2009/0104986 | A1* | 4/2009 | Englman | G07F 17/3258 463/27 |
| 2009/0194988 | A1* | 8/2009 | Wright | G07F 17/32 283/94 |
| 2009/0233690 | A1* | 9/2009 | Okada | G07F 17/3227 463/43 |
| 2009/0305765 | A1* | 12/2009 | Walker | G07F 17/34 463/43 |
| 2010/0190541 | A1* | 7/2010 | Lazar | G07F 17/329 463/17 |
| 2014/0100014 | A1 | 4/2014 | Bennett, III et al. | |
| 2014/0364187 | A1* | 12/2014 | Chang | G07F 17/3288 463/17 |
| 2017/0256123 | A1* | 9/2017 | Reid | G07F 17/326 |

FOREIGN PATENT DOCUMENTS

EP 1 133 338 9/2001

OTHER PUBLICATIONS

Search Report for FI Application No. 20205378 dated Jul. 2, 2020, 1 page.
Extended European Search Report issued on Aug. 17, 2021 in corresponding European Application No. 21167352.0, 10 pages.

* cited by examiner

*Primary Examiner* — Paul A D'Agostino
(74) *Attorney, Agent, or Firm* — Nixon & Vanderhye PC (57) ABSTRACT An electronic depleting pool lottery solution, in which there is, for a set of lottery tickets, at least a record that comprises at least an identifier of the set, prize distribution information and permutation information. When a lottery ticket is bought, an initial index value is assigned, and one or more permutations are performed to the initial index value, the result being a final index value. The prize of the lottery ticket is determined using the final index value and the prize distribution information.

7 Claims, 7 Drawing Sheets

ELECTRONIC DEPLETING POOL LOTTERY

REFERENCE TO RELATED APPLICATIONS

This application claims priority to Finnish patent application no. 20205378, filed on Apr. 9, 2020, the contents of which is hereby incorporated herein by reference in its entirety.

FIELD

The present invention relates to a depleting pool lottery, and especially for determining a prize of an electronic lottery ticket within a set of a predetermined size.

BACKGROUND ART

The evolvement of data processing and communications technology have digitalized different games, including different lottery games. For example, document EP 1133338 discloses a solution in which a lottery agent determines a size of a set of electronic lottery tickets, and distribution of prizes, and request a lottery press, for example a supervisor, to generate the set of electronic lottery tickets. During the generation, a ticket-specific key is generated for each ticket, each ticket is associated with a corresponding prize, which is encrypted using the ticket-specific key by the lottery press, and stored with a ticket identifier to a lottery database, wherefrom the lottery agent sells the lottery tickets, and keeps information on sold lottery tickets. The ticket—specific key—ticket identifier pairs are stored in a key database, which is separate from the lottery database. When a ticket is bought, the lottery agent transmits the encrypted prize with the ticket identifier to the buyer's apparatus, which then requests the ticket-specific key, using the ticket identifier, from the key database, and after receiving the ticket-specific key, decrypts the prize. Hence, the system is rather complex.

BRIEF DESCRIPTION

The invention relates to a method, a program product, an apparatus and a system which are characterized by what is stated in the independent claims. The preferred embodiments are disclosed in the dependent claims.

A general aspect introduces a solution in which there exists, for a set of lottery tickets, a record, which comprises at least an identifier of the set, prize distribution information and permutation information. The information in the record is used to determine, for a bought lottery ticket, an initial index value, which undergoes one or more permutations to a final index value. The final index value is used to determine a prize of the bought ticket.

BRIEF DESCRIPTION OF THE DRAWINGS

In the following, exemplary embodiments will be described in greater detail with reference to accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
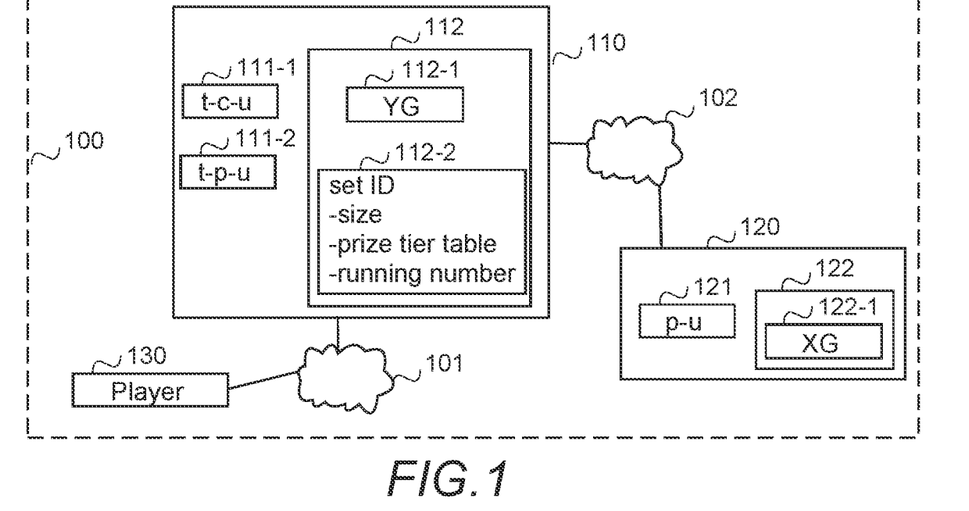
FIG. 1 shows simplified architecture of a system and block diagrams of some apparatuses.

The present invention is applicable to any depleting pool based electronic lottery. An extremely general architecture of an exemplary system 100 is illustrated in FIG. 1. FIG. 1 is a simplified system architecture only showing some elements, functional entities, which are logical units whose implementation may differ from what is shown, and some equipment. It is apparent to a person skilled in the art that the system comprises any number of shown elements, other equipment, and structures that are not illustrated.

The system 100 illustrated in FIG. 1 comprises lottery agency equipment 110, supervisor equipment 120, and player apparatuses 130 (only one illustrated in FIG. 1), and one or more networks 101, 102 (only two illustrated in FIG. 1).

The equipment 110, 120 refers to an information system comprising one or more computing devices (computing apparatuses) that can be configured to perform at least part of functionalities described below.

In the illustrated example of FIG. 1, the lottery agency equipment 110 comprises, for the electronic depleting pool lottery, a lottery ticket set creation unit (t-c-u) 111-1, a lottery ticket set playing (consuming) unit (t-p-u) 111-2 and a data storage 112 comprising a secret global permutation key 112-1 (YG), or shortly secret global key, and one or more records 112-2 (lottery records), a record comprising for a set of lottery tickets at least an identifier of the set, prize distribution information and permutation information, for example the key required for pseudorandom permutation. These records are called herein also as agency records. In the illustrated example, the prize distribution information comprises a prize tier table, or more precisely prize tier definitions, which may be expanded to be an actual table. In another implementation, the prize distribution information may be a pointer to a corresponding definition, shared by two or more sets of lottery tickets. Further, in the illustrated example, a set-specific permutation key (key 1) is derived each time it is required, the permutation information stored comprises the size of the set and a value of a running number. The size of the set may be a pointer to a value shared by two or more sets of lottery tickets. Further examples on the permutation information are given below, for example with FIGS. 3B and 3C. Below term "agency" is used as a synonym to the lottery agency equipment. It should be appreciated that the agency 110 comprises other units and data records, for example, for player registration, payment verification, player authentication and for games that are not based on depleting pool lottery principles, not illustrated herein. Further, it should be appreciated that the lottery ticket set creation unit 111-1 and the lottery ticket set playing unit 111-2 may be integrated into one unit.

The supervisor equipment 120 comprises for the electronic depleting pool lottery a permutator unit (r-u) 121, and a data storage 122 comprising a secret global permutation key 122-1 (XG), or shortly secret global key. Below the term "supervisor" is used as a synonym to the supervisor equipment. The supervisor can be seen as a trusted party (trusted third party). However, it should be appreciated that in some implementations there is no separate supervisor but the supervisor is a separate distinct sub-part of the agency, for example, a certified random number generator (RNG) module, in which case the information exchange described below is internal information exchange. It should be appreciated that the supervisor may comprise other units and data records. Further, it should be appreciated that even though the permutator unit 121 is depicted as one unit, its functionality may be split over two or more separate units.

The data storages 112, 122 may be any kind of conventional or future data repository, including distributed and centralized storing of data, managed by any suitable management system. An example of distributed storing includes a cloud-based storage in a cloud environment (which may be a public cloud, a community cloud, a private cloud, or a hybrid cloud, for example). In other words, a data storage 112, 122 may be any computing system, or a sub-system, equipped with one or more memories and comprising computing devices that are configured to appear as one logical data storage for the agency or the supervisor, or unit(s) that store data thereto and/or retrieve data therefrom. However, the implementation of the data storage 112, 122, the manner how data is stored, retrieved and updated, i.e. details how the data storage is interfaced, and the location where the data is stored are irrelevant to the invention.

The player apparatus 130 refers to any computing device (apparatus, equipment), that is configurable to support electronic gaming, including buying depleting pool lottery tickets. The player apparatus may be a portable device or a non-portable device. The player device may establish a connection to the agency over one or more of the one or more networks 101. However, the player apparatus need not to be configured, but nevertheless may be configured, to receive an encrypted prize and decrypt it, and the prize may be shown to a user with using any existing and future method, including different animations. In other words, the implementation of electronic gaming between the player apparatus and the agency needs no modifications, is irrelevant for the disclosed solutions, and therefore the player apparatus is not described in more detail herein. Term "player" is used below to cover a combination of the player apparatus and its user.

The network 101 depicts one or more networks over which the player 130 may connect to the agency 110 for gaming purposes. The network 102 depicts one or more networks over which the agency 110 and the supervisor 120 may connect for purposes described below. The one or more networks 101, 102 may be based on any wired technology and/or any wireless technology, a network being a local area network or a public network or a private network, or any combination thereof. Further, it should be appreciated that the one or more networks 101, 102 may comprise same physical networks. Further, in case the supervisor 120 is a sub-part of the agency 110, there may be no network 102.

In the example illustrated in FIG. 1, it is assumed that permutation keys are derived from the secret global keys. However, one or both of them may be replaced by a set-specific key, which may be part of the permutation information in the agency data storage 112-2, or in a set-specific record, called a supervisor record, for example, in the supervisor data storage 122. Still a further possibility utilizes a set-specific permutation list, which may be pre-generated or generated gradually.

Below different examples are described merely mentioning that something is send (caused to be sent) or received, or a lottery ticket being bought without describing further details of sending and receiving and buying lottery tickets. The details of the communication technology, including protocols and messages used, the details relating to a user electronically buying one or more lottery tickets, the details relating to security, including authentication of users, verifying equipment and transactions, encrypting and decrypting information exchange, are well known by persons skilled in the art, are irrelevant to the described examples, and no modifications are needed to them. Therefore, they need not to be discussed in more detail here. Further, it should be appreciated that any future technology may be used as well with the examples.

Figure 2A:
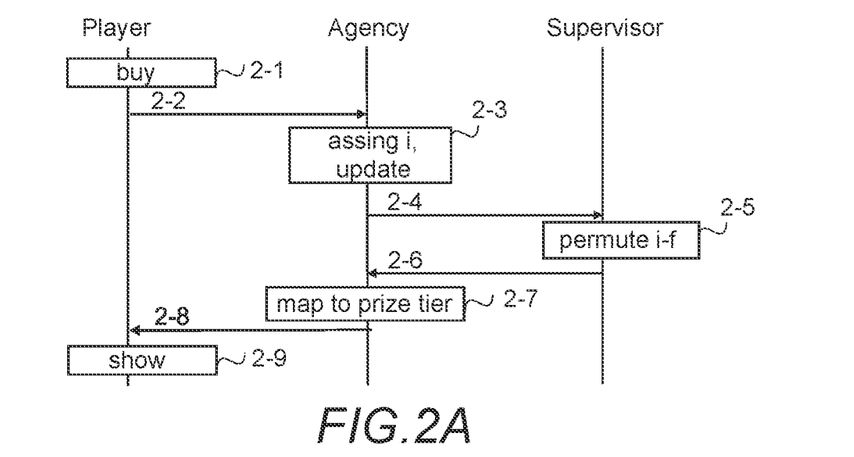
FIGS. 2A and 2B illustrate examples of information exchange when a lottery ticket is played.
Figure 2B:
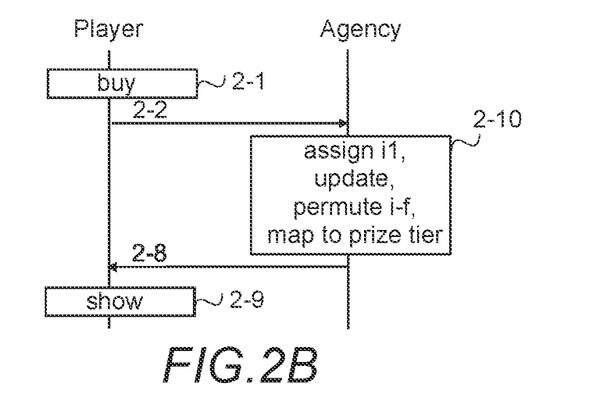

FIGS. 2A and 2B illustrate examples of information exchange during a gaming process, when a lottery ticket within a set is played, FIG. 2A in case there is an external supervisor and FIG. 2B when there is no external supervisor, but the agency is configured to comprise the supervisor module. Different ways of how to create the set are described in more detail below with FIGS. 3A, 3B and 3C. The set has an identifier, prize tier table, and permutation information.

Referring to FIG. 2A, when a player successfully buys (point 2-1) a lottery ticket, the agency receives (message 2-2) corresponding information. Then the agency at least assigns in point 2-3 an initial index value i for the bought lottery ticket and updates in point 2-3 the agency record of the set, for example as will be described in more detail with FIGS. 5A, 5B and 5C. Then the agency sends in message 2-4 at least the identifier of the set and the initial index or a first index value, obtained by performing one or more permutations to the initial index value, to the supervisor. Depending on the implementation, message 2-4 may also include also the size of the set.

The supervisor detects, for example based on header information or message content, that the agency requests an index value. Therefore the supervisor permutes, i.e. performs one or more permutations, in point 2-5, the received index value, the result being a final index value i-f, for example as will be described in more detail with FIGS. 6A and 6B, and sends, as a response to message 2-4, the final index value in message 2-6 to the agency.

When the agency receives in message 2-6 the final index value, the agency maps in point 2-7 the received value to a corresponding prize tier using the prize tier table. In other words, the prize tier table associates an index value to one of the prize tiers (prize categories), including no prize, and the final index value is used to determine the prize tier, and thereby the actual prize (prize amount, win). The determined prize is then sent in message 2-8 to the player and displayed (shown) in point 2-9 to the user.

Compared to the solution discussed in the background portion, less information exchange is required during the gaming process. Further, less processing power is required from the player, since no decrypting of the received prize is performed.

Referring to FIG. 2B, when a player successfully buys (point 2-1) a lottery ticket, the agency receives (message 2-2) corresponding information. Then the agency assigns in point 2-10 an initial index value i for the bought lottery ticket and updates in point 2-10 the agency record of the set, for example as will be described in more detail with FIGS. 5A, 5B and 5C. Then the agency permutes, i.e. performs one or more permutations, in point 2-10, to the initial index value, the result being the final index value i-f, for example as will be described in more detail with FIGS. 6A and 6B. It may be that the key 1 is used to perform one or more pseudorandom permutations to the initial index value, and the result then undergoes one or more pseudorandom permutations which uses the key 2. Then the agency maps in point 2-10 the final index value to a corresponding prize using the prize tier table, as described above. The determined prize is then sent in message 2-8 to the player and displayed (shown) in point 2-9 to the user.

In the below examples, it is assumed, for the sake of clarity, that there is an external supervisor, which performs one pseudorandom permutation, and that the agency performs at most one pseudorandom permutation to an assigned initial index value. Implementation of any of the examples to a solution in which there is no external supervisor, and/or more permutations than the described ones are performed and/or any of the pseudorandom permutations is replaced by another type of permutation, is straightforward for a person skilled in the art. For the sake of clarity, below the term "first index value" is used as a synonym to "a first pseudorandom index value" and with FIGS. 3C and 5C also as a synonym to an initial index value. Further, below term "second index value" is used as a synonym to "second pseudorandom index value" and "final index value".

Figure 3A:
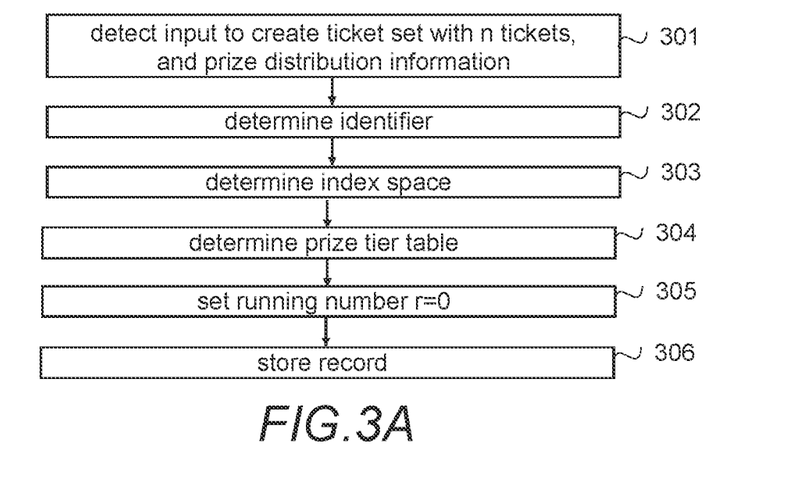
FIGS. 3A, 3B, 3C, 4, 5A, 5B, 5C, 6A and 6B are flow chart illustrating exemplary functionalities.
Figure 3B:
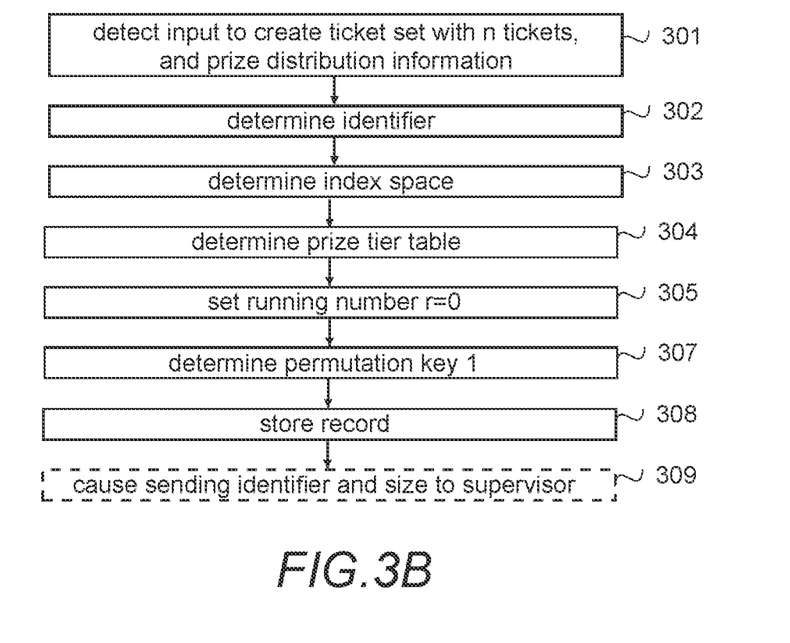
Figure 3C:
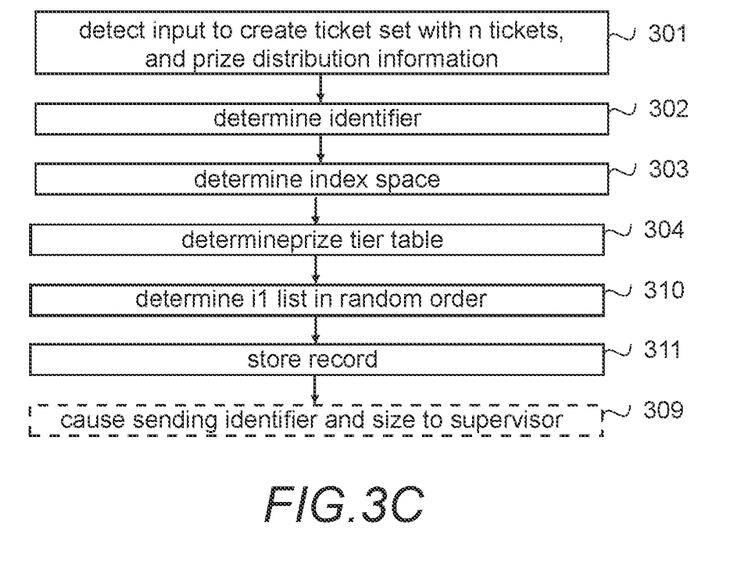

FIGS. 3A, 3B and 3C illustrate different examples of a functionality of the agency when a new set of lottery tickets is created, and more precisely examples of a functionality of the lottery ticket creation unit the agency equipment comprises. Steps that are the same in both examples have the same number.

FIG. 3A describes an example in which the creation of a set of lottery tickets results to the record illustrated in FIG. 1. In other words, in the illustrated example of FIG. 3A the agency is configured to use derive a set-specific permutation key (key 1) each time it is required.

Referring to FIG. 3A, an input to create a new set of lottery tickets is received in step 301. In the illustrated example it is assumed that the input also comprises information on the size of the set, i.e. the number n of the tickets, and prize distribution information, such as prize tiers and how many tickets belong to each prize tier. For example, the set may comprise 1 000 000 lottery tickets, i.e. the value n=1 000 000, and the prize distribution information may be that there are two prize tiers, a jackpot and empty, wherein there are 10 tickets with the jackpot (meaning that the rest of the tickets in the set are empty).

An identifier for the set is determined (generated) in step 302. There are no limitations what the identifier comprises, how long it is and how it is generated, as long as the identifier uniquely identifies the lottery set at the agency. The identifier may, for example, be a combination of the lottery name and a running number or a globally unique identifier (GUID), for example a universally unique identifier (UUID), which is used to identify information in computer systems.

An index space N is determined in step 303, using the size, i.e. the value n. The index space may be determined as follows:

$$N=\{i \in Z | 0 \leq i \leq n\}$$

wherein
N=index space
i=index value
Z means integer
n=number of tickets in the set (size of the set)
For the given example the index space is:

$$N=\{i \in Z | 0 \leq i < 1000000\}$$

A prize tier table is determined in step 304, using the prize distribution information. The prize tier table may be a straightforward mapping of the index space and prize tier. Naturally, also other kinds of mappings may be used. Using the straightforward mapping with the given example, the prize tier table may be expressed and stored as follows:

$$V(i) = \begin{cases} \text{jackpot} & 0 \leq i < 10 \\ \text{empty} & 10 \leq i < 1\,000\,000 \end{cases}$$

However, as said above, the prize tier table could be expressed in many ways, for example as follows:

$$V(i) = \begin{cases} \text{empty} & 0 \leq i < 999\,990 \\ \text{jackpot} & 999\,990 \leq i < 1\,000\,000 \end{cases}$$

$$V(i) = \begin{cases} \text{empty} & 0 \leq i < 10 \\ \text{jackpot} & 10 \leq i < 20 \\ \text{empty} & 20 \leq i < 1\,000\,000 \end{cases}$$

As can be seen from the above examples, the only requirement for the prize tier table is that an index value maps unambiguously to a prize tier, and thereby to a prize.

Further, in the illustrated example it is assumed that the first sold (bought) lottery ticket gets a running number value 0, the second sold (bought) lottery ticket gets a running number value 1, the third sold (bought) lottery ticket gets a running number value 2, etc. Therefore a running number value r is initialized to be zero in step 306. In other words, r is set to be equal to zero (r=0). Naturally any other way may be used as well.

Then the set of tickets has been created in the agency, and corresponding information is stored in step 307 to the data storage as an agency record comprising the identifier, n, N, V(i), r.

It may be that the input detected in step 301 comprises only instructions to create a new set, for example triggered because of a previous set is determined to be sold out. Then steps 303 and/or 304 may be merely adding pointers to memory locations comprising the corresponding information, depending on, for example rules relating to whether or not to combine unsold tickets of the previous set to the new set. However, that is irrelevant for the described solutions, and is therefore not discussed in detail here.

FIG. 3B illustrates an example in which the agency is configured to use set-specific permutation key, permutation key 1. In other words, in the example the secret global key is not used during the gaming process. Therefore, the process described in FIG. 3B differs from the one described in FIG. 3A that there exists an additional step and the storing step is a little bit different.

Referring to FIG. 3B, after steps 301 to 304 are performed, as described above, a permutation key, called herein also key 1 and permutation key 1, is determined in step 307. The permutation key may be derived from the identifier of the set or part of the identifier, or it may be randomly generated.

Then the set of tickets has been created in the agency, and corresponding information is stored in step 308 to the data storage as an agency record comprising the identifier, n, N, V(i), key 1, r.

In the illustrated example it is also assumed that the supervisor may be configured to use its secret global permutation key, or a set-specific key. In case the supervisor is configured to use the set-specific key, sending at least the identifier and possibly the size, i.e. n, to the supervisor is caused in step 309, and the creation process for this set of lottery tickets can be ended.

Naturally step 309 may be performed after step 306 in the process described with FIG. 3A.

FIG. 3C illustrates an example in which the agency is configured to create (generate), for example as part of the agency record, a list listing the index space in a random order, for example 999 999, 4, 700 etc. Therefore, the process described in FIG. 3C differs from the one described in FIG. 3A that no step 305 is performed and the storing step is a little bit different.

Referring to FIG. 3C, after steps 301 to 304 are performed, as described above, a list, called herein "i1 list", is created in step 310. In other words, index values defined by the index space are listed to the i1 list in a random order, i.e. the index values undergo a permutation. For example, a random number generator configured to generate a list of random numbers without repetition, when the amount of numbers in the list and a specified range is inputted, may be used. The list may be generated in a form of a table. Once the i1 list is ready, corresponding information is stored in step 311 to the data storage as an agency record comprising the identifier, N, V(i), and the i1 list created, or a pointer to the i1 list, if stored elsewhere. Further, sending the identifier and possibly the size, i.e. n, to the supervisor may be caused in step 309, as described above with FIG. 3B, and the creation process for this set of lottery tickets can be ended.

The i1 list created in step 311 is the permutation information.

Figure 4:
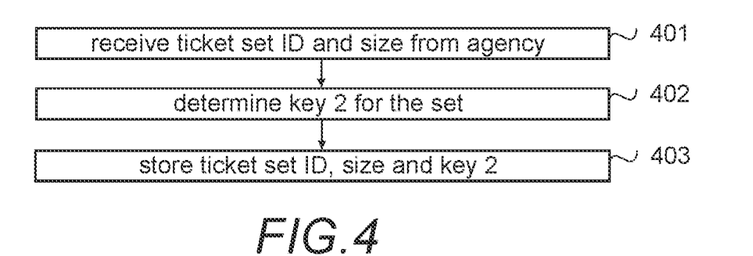

FIG. 4 illustrate an example of a functionality of the supervisor, and more precisely an example of a functionality of the permutator unit the supervisor equipment comprises, when the supervisor is configured to use a set-specific key (set-specific permutation key), and a new set of lottery tickets is created.

Referring to FIG. 4, an identifier of a set of lottery tickets and the size of the set are received in step 401 from the agency. A permutation key (key 2, or X) for the set is determined in step 402. The permutation key may be determined by generating it from the identifier, for example. Then the identifier of the set, the size and the permutation key (permutation key 2, or shortly key 2) are stored in step 403 in a supervisor record for the set of lottery tickets, and the creation process of a new set of lottery tickets ends.

In another implementation, only the identifier is received in step 401, and the supervisor record comprises the identifier and the permutation key 2.

Figure 5A:
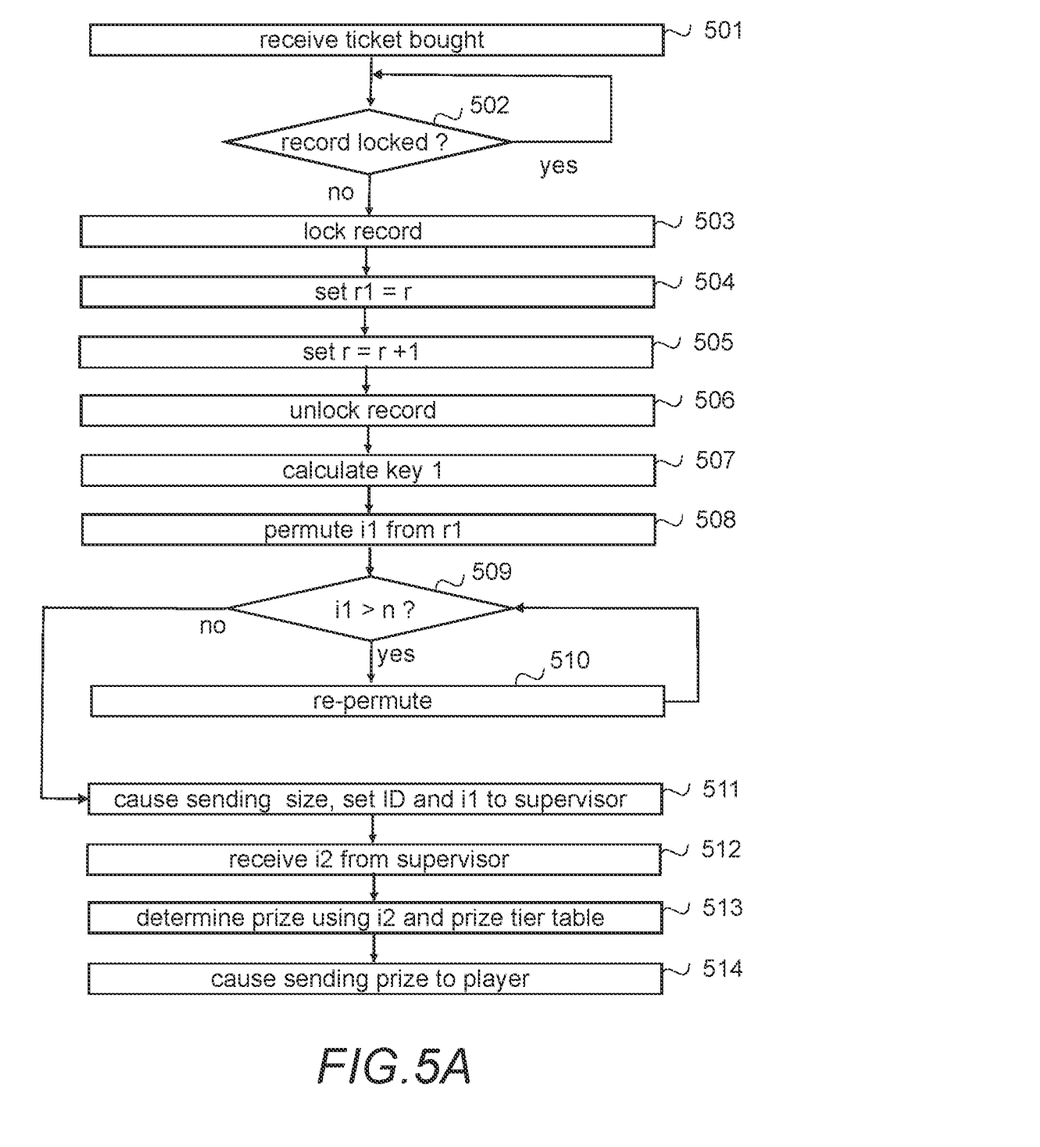
Figure 5B:
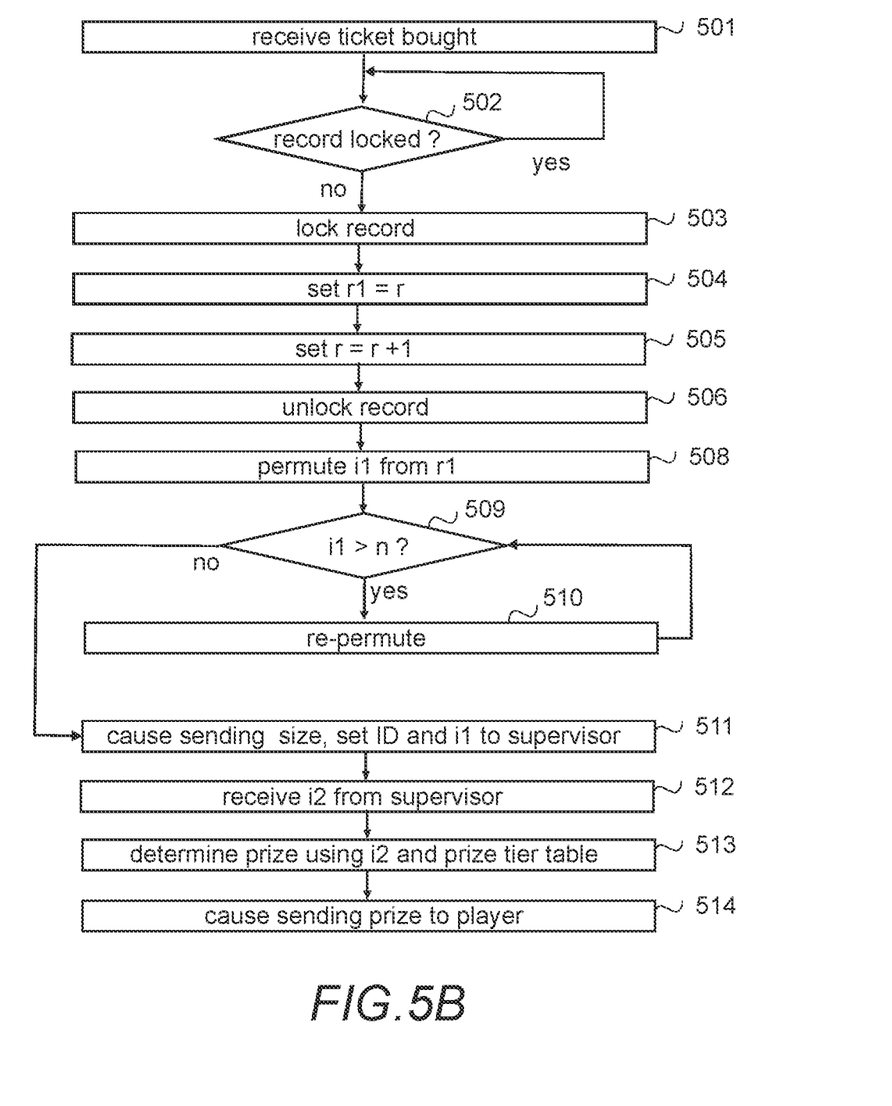
Figure 5C:
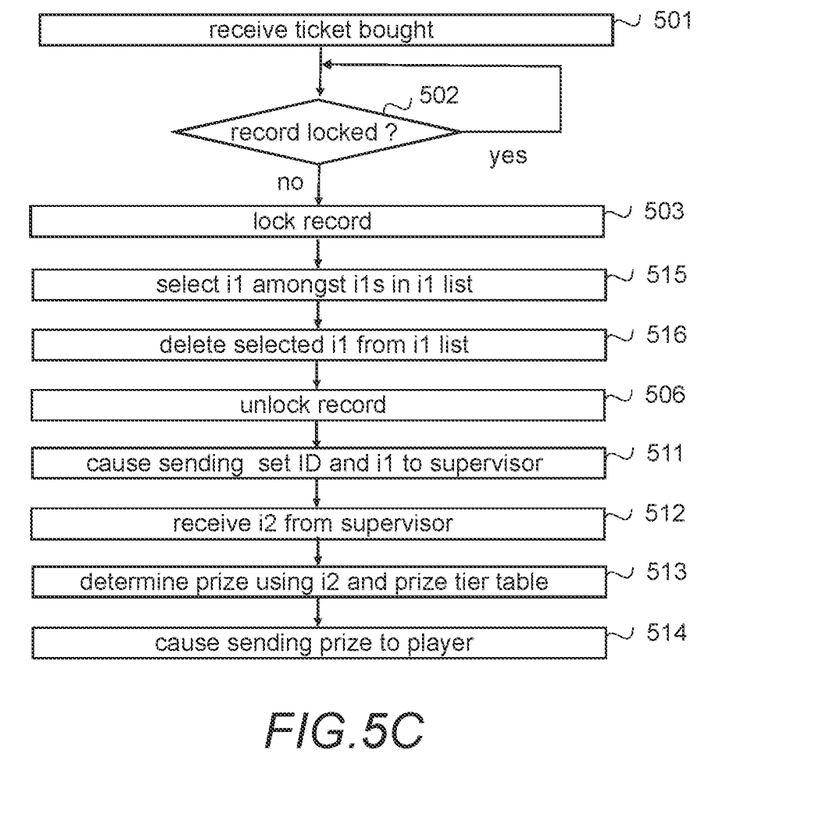

FIGS. 5A, 5B and 5C illustrate different examples of a functionality of the agency when lottery tickets are bought, and more precisely examples of a functionality of the lottery ticket playing unit the agency equipment comprises, FIG. 5A a process when the agency is configured to use the process of FIG. 3A, and FIG. 5B, when the agency is configured to use the process of FIG. 3B and FIG. 5C when the agency is configured to use the process of FIG. 3C. Steps in FIGS. 5A, 5B and 5C that are the same have the same number. Further, in the illustrated examples it is assumed, for the sake of clarity, that an attempt to buy a ticket from set of tickets determined to be sold out fails.

Referring to FIG. 5A, when information that a lottery ticket has been successfully bought (including buyer verifications and payment verifications etc.) is received in step 501, it is check in step 502, whether the agency record is locked. If the agency record is locked (step 502: yes), the checking is performed until the agency record is unlocked (step 502: no). Then the agency record is locked in step 503 for this lottery ticket purchase, and an initial index value r1 is assigned (set) in step 504 to be the value of the running number r in the agency record. For example, if the lottery ticket was the first bought lottery ticket, r1=0. After that the value of the running number r in the agency record is increased by one by setting in step SOS the running number r to be r+1. Then the agency record is unlocked in step 506. In other words, the permutation information can be updated as an atomic function. Thanks to that, the agency record is locked a very short time.

Then the process continues to calculate (generate) the set-specific permutation key 1 by inputting to a pseudorandom function (PRF) the global permutation key and the identifier of the set, the result being the value of key 1. For example, Hash-based Message Authentication Code (HMAC), such as HMAC-SHA-256, may be used. It should be appreciated that any pseudorandom function may be used. The key 1 is then used in step 508 to permute from the initial index value r1 a first index value using pseudorandom permutation P (key 1, r1). The permuting, i.e. performing a pseudorandom permutation, may be performed using a format preserving encryption (FPE) algorithm whose domain is exactly N, i.e. the same as the index space. For example, an algorithm called FF1 may be used. FF1 is an FPE algorithm for numerical strings, i.e. FF1 encrypts a given string into another string of the same length and alphabet. For example, a binary string "00110" could be encrypted to "10011" using a certain key. First index value i1 could then be permuted by encoding it as such string, encrypting the string using permutation key 1, and decoding the result back into an integer. For a valid permutation, all indices of a ticket set must be encoded into binary strings of fixed length. The required length can be calculated by ceil($\log_2$(n−1)), and all strings should be left-padded with zeros to this length. In the example n=1000000, ceil($\log_2$(1000000−1))=20, meaning that the required length is 20 bits. Correct encoding of index 29634 would then be "00000111001111000010". However, since $2^n$ is bigger than n, (in the example $2^{20}$=1 048 576>1 000 000) all the binary strings after being decoded are not within the index space N. Therefore it is checked in step 509, whether the first index value i1 is bigger than n.

If the first index value i1 is bigger than n (step 509: yes), a re-permutation is performed (step 510) until the first index value i1 is not bigger than n (step 509: no). This re-permutation process is called cycle walking and it is guaranteed to terminate and to produce a valid permutation.

If, or after re-permuting when, the first index value i1 is smaller than or equal to the size of the set (step 509: no), sending of the size, i.e. n, the identifier of the set and the first index value i1 to the supervisor is caused in step 511.

When a second index value i2 is received in step 512 from the supervisor, the prize of the lottery ticket bought is determined in step 513 using the received second index value i2 and the prize tier table. For example, using the example set: if r1=0, i1=793519 and i2=206836, V(i)=V (206836) gives the prize "empty". Once the prize has been determined, sending the prize to the player is caused in step 514.

Following table lists further examples, based on the example set. In the table, i means the initial index value r1, P(Y,i) is a synonym to the first index value i1, and P(X, P(Y,i)) is a synonym to the second index value i2, Y means the permutation key of the agency (key 1), which is a result of PRF(YG, set ID), and X means the permutation key of the supervisor (key 2), which may be a result of PRF(XG, set ID). Since the agency does not know the permutation key of the supervisor, prizes are random for the agency. Since the supervisor does not know the permutation key of the agency, the lottery tickets are bought (sold) in a random order from the supervisor's perspective.

| i | P(Y, i) | P(X, P(Y, i)) | V(P (X, P(Y, i))) |
|---|---------|---------------|-------------------|
| 0 | 793519 | 206836 | empty |
| 1 | 141663 | 5 | jackpot |
| 2 | 344538 | 268300 | empty |
| ... | | | ... |
| 999999 | 513121 | 675713 | empty |

After the set of tickets has been sold out, the process may be verified afterwards by sharing the values of the permutation keys used by the agency and the supervisor for the set. If the agency receives the value of the key 2, it can verify the results of the supervisor, and vice versa if the supervisor receives the value of the key 1, it can verify the results of the agency.

FIG. 5B illustrates an example in which the agency record comprises the set-specific permutation key 1. Therefore the process described in FIG. 5B differs from the one described in FIG. 5A that step 507, i.e. calculating the key 1, is skipped over. The other steps are the same, and hence are not repeated in vain herein.

FIG. 5C illustrates an example in which the agency is configured to create, for example as part of the agency record, a list listing the index space in a random order.

Referring to FIG. 5C, after steps 501 to 503 are performed, as described above with FIG. 5A, the first index value i1 is selected in step 515 amongst the index values in the i1 list. The selection may be used randomly, or according to a predetermined order. For example, if the i1 list is the content of column P(Y,i) above, and the lottery ticket bought is the first one, and the first one in the i1 list is selected, in step 515 value 793519 is selected to be the first index value. Then, in the illustrated example, the selected first index value is deleted in step 516 from the i1 list. After that, using the P(Y,i) column content as an example of the i1 list, the first one in the i1 list is 141663. Then the process continues to step 506 to unlock the agency record. Further, sending of the identifier of the set and the first index value i1 to the supervisor is caused in step 511, and then steps 512, 513 and 514 are performed as described above.

Instead of deleting the values in the i1 list, the values may be marked to be used values. In such a solution the selection is made amongst unused values.

Further, instead of using a pre-generated list, the list may be generated gradually. For example, the list may be a stack of index values and a pointer pointing, when the new set is created, to the topmost index value, for example. In such a solution step 515 may be replaced by the following: changing the index value, to which the pointer points, to any randomly selected index value amongst the pointed index value and any index value below it, and after that selecting the pointed index value to be the first index value. Then, instead of the above described step 516, the pointer is moved to point to an index value just below the previous index value in the stack. Naturally the pointer-based solution may be used to create a pre-generated list (i.e. in step 310 in FIG. 3C).

Figure 6A:
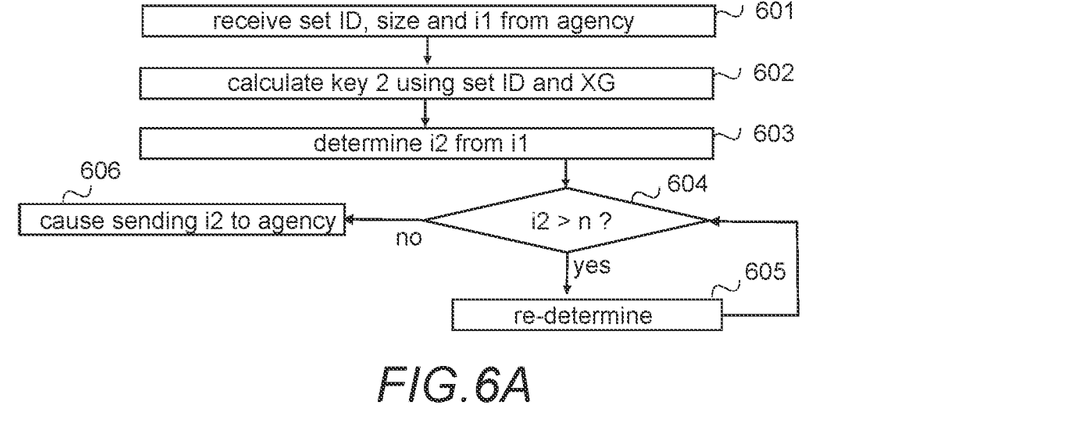
Figure 6B:
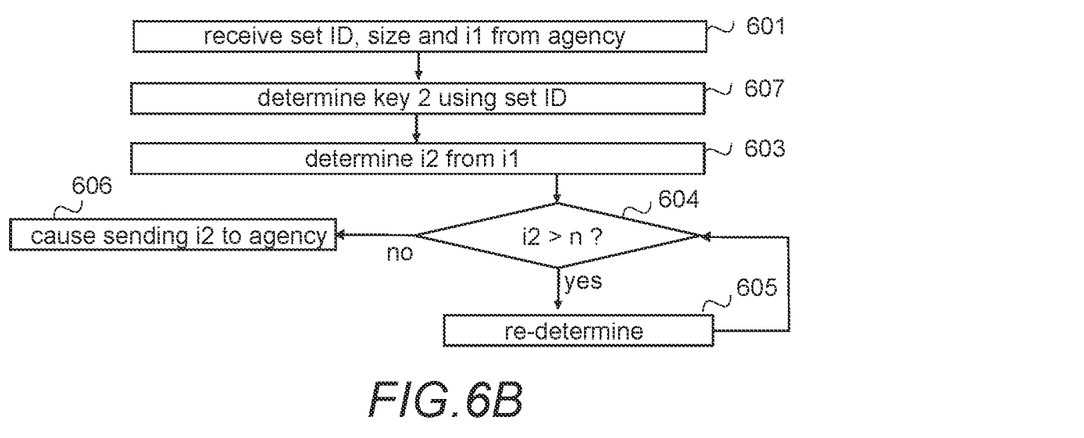

FIGS. 6A and 6B illustrate different examples of a functionality of the supervisor and more precisely examples of a functionality of the permutator unit the supervisor equipment comprises, when a lottery ticket has been bought, FIG. 6A when the supervisor is configured to use the secret global permutation key, and FIG. 6B when the supervisor have supervisor records, a record comprising an identifier and set-specific permutation key 2.

Referring to FIG. 6A, an identifier of a set of lottery tickets, its size and a first index value are received in step 601. Then the process continues to calculate (generate) in step 602 the set-specific permutation key 2 by inputting to a pseudorandom function (PRF) the secret global permutation key of the supervisor and the identifier of the set, the result being the value of key 2. The step 602 corresponds to step 507 described above, with the difference that different secret global keys are used. Then the second index value is permuted in steps 603 to 605, as described above with steps 508 to 510, with the exception that different inputs, the first index value, and the permutation key 2 calculated in step 602, are used in the pseudorandom permutation, the result being the second index value. In other words, permutation P(key 2, i1) is performed.

If, or after re-permutation when, the second index value i2 is smaller than or equal to the size of the set (step 604: no), sending of the second index value i2 to the agency is caused in step 606.

FIG. 6B illustrates an example in which there is the supervisor record, which comprises the identifier of the set and the set-specific permutation key 2. Therefore the process described in FIG. 6B differs from the one described in FIG. 6A that instead of calculating the key 2 (step 602), the corresponding supervisor record, and the key 2 in the record, is selected (determined) in step 607 using the identifier received. The other steps are the same, and hence are not repeated in vain herein.

It should be appreciated that if the supervisor record comprises also the size of the set, there is no need to transmit the size to the supervisor; it suffices that the identifier and the first index value are received in step 601.

As is evident from the above examples, creating a set of lottery tickets does not require pre-generating huge amount of data, such as ticket-specific keys and ticket-specific records. Further, the lottery tickets in the set may be bought (sold) in a parallel fashion, with a fixed time per a lottery ticket, enabling horizontal scalability. The playing process (buying/selling) is deterministic after the set of lottery tickets has been created. The process is also secure, since neither party, i.e. the agency or the supervisor, cannot independently figure out the selling order (buying order) of lottery tickets of different prize tiers, since the order is determined using two phase cryptographic mapping, one at the agency and one at the supervisor. To figure out a selling order of tickets, which enables a fraud, requires that one should know all permutation keys. That is easier if only one party performs the pseudorandom permutation. Further, it is possible to cross validate the playing process by sharing the secret permutation information. In other words, the above described examples disclose a depleting pool based electronic lottery mechanism that is space efficient, time efficient, deterministic and secure.

The steps, related functions, and information exchanges described above by means of FIGS. 2A to 6B are in no absolute chronological order, and some of them may be performed simultaneously or in an order differing from the given one. Other functions can also be executed between them or within them, and other information may be sent. Some of the steps or part of the steps or one or more pieces of information can also be left out or replaced by a corresponding step, or part of the step, or one or more pieces of information.

Figure 7:
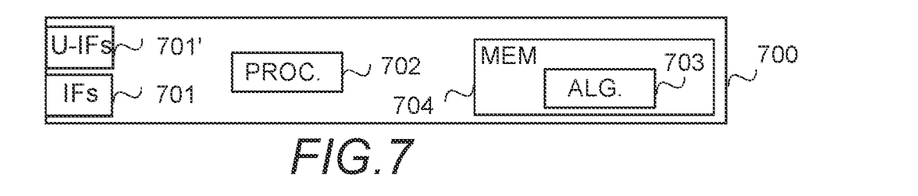
FIGS. 7 and 8 are block diagrams of exemplary equipment.

FIG. 7 illustrates an apparatus 700 configured to carry out the functions described above in connection with the agency. Each apparatus 700 may comprise one or more processing circuitries, such as at least one processor 702, and at least one memory 703, including one or more algorithms 704, such as a computer program code (software) wherein the at least one memory and the computer program code (software) are configured, with the at least one processor, to cause the apparatus to carry out any one of the exemplified functionalities of the agency. The apparatus 700 further comprises different interfaces 701, 701', such as one or more interfaces 701 for communication, for example with the supervisor and with the players, and one or more user interfaces 701' to user interaction. The one or more user interfaces 701' may be any kind of a user interface, for example a screen, or other display, a keypad, etc., for interaction with the user.

Figure 8:
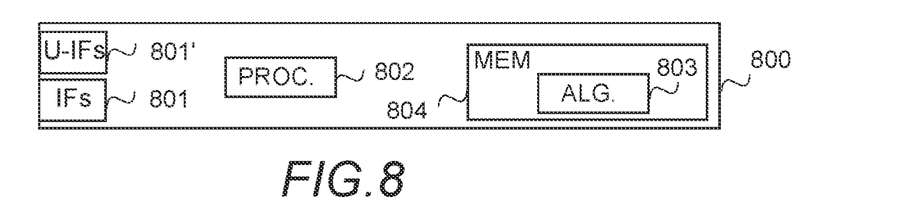

FIG. 8 illustrates an apparatus 800 configured to carry out the functions described above in connection with the supervisor. Each apparatus 800 may comprise one or more processing circuitries, such as at least one processor 802, and at least one memory 803, including one or more algorithms 804, such as a computer program code (software) wherein the at least one memory and the computer program code (software) are configured, with the at least one processor, to cause the apparatus to carry out any one of the exemplified functionalities of the supervisor. The apparatus 800 may further comprise different interfaces 801, 801' such as one or more interfaces for communication, for example with the agency, and one or more user interfaces 801' to user interaction. The one or more user interfaces 801' may be any kind of a user interface, for example a screen, or other display, a keypad, etc., for interaction with the user.

Referring to FIGS. 7 and 8, at least one of the processing circuitries in the apparatus 700, 800 is configured to provide the corresponding equipment functionality or the lottery ticket set creation unit and/or the lottery ticket set playing unit, and/or the permutator unit, or any corresponding unit/sub-unit, and to carry out functionalities, described above by means of any of FIGS. 2A to 6B, by one or more circuitries.

The memory 704, 804 or part of it may be implemented using any suitable data storage technology, such as semiconductor based memory devices, flash memory, magnetic memory devices and systems, optical memory devices and systems, fixed memory and removable memory.

The one or more interfaces 701, 801 may comprise communication interfaces comprising hardware and/or software for realizing communication connectivity according to one or more communication protocols.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application.

In an embodiment, the at least one processor, the memory, and the computer program code form processing means or comprises one or more computer program code portions for carrying out one or more operations of equipment (unit) according to any one of the examples of FIGS. 2A to 6B, or operations thereof.

Embodiments and/or examples as described may also be carried out in the form of a computer process defined by a computer program or portions thereof. Embodiments and/or examples of the methods described in connection with FIGS. 2A to 6B may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the examples as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment/example. It will be obvious to a person skilled in the art that, as technology advances, the inventive concept can be implemented in various ways. Further, it is clear to a person skilled in the art that the described examples may, but are not required to, be combined with other examples in various ways.

What is claimed is:

1. A computer-implemented method for running an electronic depleting pool lottery based game, the method comprising:

storing in a memory of a game management computing system, for a set of lottery tickets usable in the game, a record comprising at least an identifier of the set, prize distribution information, and permutation information, the set having a lifetime associated therewith;

in response to receiving from an apparatus different from the game management computing system information that a lottery ticket is acquired, assigning via a processor of the game management computing system and using the permutation information, an initial index value to the lottery ticket, the initial index value being an unused index value within an index space, the index space being based on a size of the set;

performing, by the processor of the game management computing system, one or more permutations to the initial index to generate, from the initial index, a final index value, the final index value being within the index space;

mapping, by the processor of the game management computing system, a prize to the lottery ticket using the final index value and the prize distribution information; and sending, to the apparatus from the game management computing system, information on the mapped prize.

2. The computer-implemented method of claim 1, wherein the permutation information comprises at least the size of the set and a running number, and the method further comprises:

performing the assigning by setting the initial index value to be the running number;

increasing the running number by one in the record;

calculating a set-specific permutation key using the identifier and a secret global permutation key stored to the memory; and performing one or more pseudorandom permutations to the initial index value by using the set-specific permutation key and the size.

3. The computer-implemented method of claim 1, wherein the permutation information comprises at least a size of the set, a set-specific permutation key, and a running number, and the method further comprises:

performing the assigning by setting the initial index value to be the running number;

increasing the running number by one in the record; and performing one or more pseudorandom permutations to the initial index value by using the set-specific permutation key and the size.

4. The computer-implemented method of claim 1, wherein the permutation information comprises a list of initial index values in a random order, and the assigning of the initial index value includes selecting an index value from the list.

5. The computer-implemented method of claim 1, wherein at least one of the one or more permutations is a pseudorandom permutation.

6. The computer-implemented method of claim 5, wherein performing a pseudorandom permutation to an index value includes:

comparing a result of the pseudorandom permutation to the size; and re-performing the pseudorandom permutation until the result represents a resulting index value that is smaller than or equal to the size.

7. The computer-implemented method of claim 1, the method further comprising:

creating the record in response to receiving information at least indicating the size of the set and the prize distribution information, the creating comprising at least:

determining the identifier;

determining the index space;

determining a prize tier table using the prize distribution information and the index space;

determining the permutation information; and performing the storing.

\* \* \* \* \*